(12) United States Patent
Sakai et al.

(10) Patent No.: US 6,222,603 B1
(45) Date of Patent: Apr. 24, 2001

(54) METHOD OF MANUFACTURING LIQUID CRYSTAL DISPLAY DEVICE WITH A DOUBLE SEAL

(75) Inventors: Naoto Sakai, Miyagi; Hideki Matsukawa, Osaka; Shiro Sumita, Ishikawa; Norihiko Egami; Osamu Hirota, both of Osaka, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/229,531

(22) Filed: Jan. 13, 1999

(30) Foreign Application Priority Data

Jan. 13, 1998 (JP) .................................................. 10-004868
May 19, 1998 (JP) .................................................. 10-136924

(51) Int. Cl.⁷ ......................... G02F 1/1339; G02F 1/1341
(52) U.S. Cl. ............................ 349/153; 349/189; 349/190
(58) Field of Search ................................ 349/153, 154, 349/187, 189, 190

(56) References Cited

U.S. PATENT DOCUMENTS

| | | | | |
|---|---|---|---|---|
| 5,326,420 | * | 7/1994 | Vinouze et al. | 349/153 |
| 5,410,423 | * | 4/1995 | Furushima et al. | 349/153 |
| 5,499,127 | * | 3/1996 | Tsubota et al. | 349/153 |
| 5,517,344 | * | 5/1996 | Hu et al. | 349/153 |
| 5,798,813 | * | 8/1998 | Ohashi et al. | 349/190 |

FOREIGN PATENT DOCUMENTS 7-301811 11/1995 (JP) .
9-22018 1/1997 (JP) .

* cited by examiner

Primary Examiner—Walter J. Malinowski
(74) Attorney, Agent, or Firm—Ratner & Prestia

(57) ABSTRACT

A method of manufacturing an LCD device, in which, a seal pattern is formed by applying a sealing material for enclosing a liquid crystal on one of a pair of substrates between which liquid crystal is sandwiched. Spacers are formed on the other substrate to determine a cell gap, then the substrates are respectively held by a pair of surface plates disposed in a vacuum chamber, in which at least one of the surface plates is movable. The air-pressure of the vacuum chamber is then decreased, and the alignment of a pair of substrates is performed and a cell gap is formed by pressing the substrates toward each other, by which the gap precision, the gap uniformity and the alignment precision of an LCD device can be improved.

9 Claims, 6 Drawing Sheets

METHOD OF MANUFACTURING LIQUID CRYSTAL DISPLAY DEVICE WITH A DOUBLE SEAL

FIELD OF THE INVENTION

The present invention relates to a method of manufacturing a liquid crystal display (hereinafter referred to as LCD) device for an office machine such as a personal computer, a word processor, a monitor or the like, or, for a portable communication appliance, or the like.

BACKGROUND OF THE INVENTION

In general, an LCD device has a cross sectional structure as shown in FIG. 1. In the LCD device 1 of FIG. 1, spacers 4 are scattered for forming a predetermined gap between a pair of substrates 2a and 2b having display electrodes 5a and 5b, respectively, on facing inner surfaces of the substrates, and an alignment film 7. The gap between the substrates is filled up with a liquid crystal 3, enclosed by a seal pattern 6. On the outer surfaces of the pair of substrates 2a and 2b, polarizers and the other optical films (not illustrated) are formed at respective optimal positions. The number of polarizers formed on an LCD device are two, one or none depending on the operation mode of the LCD device.

The display of an image is performed by applying voltage to the LCD device 1 and also, in a transmissive type LCD, by irradiating the light of a fluorescent tube or the like from the backside, and, in a reflective type LCD which utilizes ambient light, by disposing a reflective plate at the backside.

The conventional method of manufacturing the above LCD device 1 is described hereinafter referring to the flow chart of FIG. 8. First, at step 800 the substrates 2a and 2b having the display electrodes 5a and 5b, respectively, are cleaned. At step 802, liquid aligning material is then applied by offset printing or the like, then a pre-bake and a full-bake are performed. Thus, an alignment film 7 is formed, then alignment treatment is performed by rubbing, or the like, on the alignment film. In general, cleaning by water is performed after the rubbing (at step 804) for washing off of foreign matter and dirt at step 806.

At step 808 on one of the two substrates, e.g., on 2a, a seal pattern 6 for enclosing liquid crystal 3 is formed by applying sealing material by the method of writing, screen printing, or the like. Then ultraviolet curing type resin (hereinafter referred to as UV resin) is applied by spot-printing using a dispenser or the like outside the display area of the LCD device 1 for temporarily bonding the substrates. In addition, at step 810 on another substrate 2b, spacers 4 of a predetermined size for forming a gap are formed, such as by spraying. At step 812, position alignment of the substrates 2a and 2b is performed in the atmosphere, and, after the alignment, the two substrates are temporarily bonded together. Here, the alignment of the substrates 2a and 2b is performed up to a predetermined accuracy referring to the alignment marks which are optically recognizable and are disposed in advance on the display electrodes of the respective substrates. Then the UV resin for temporarily bonding is cured by irradiating with ultraviolet rays.

At step 814, a gap forming and seal pattern curing process is performed where the substrates 2a and 2b are pressed toward each other by an air-press or the like for obtaining a predetermined thickness of the gap of the LCD device 1, and when the gap becomes the predetermined thickness, the seal pattern 6 is cured. Here, if a heat-curing-type sealing material is used for the seal pattern 6, it is cured by heating with heater lines disposed inside the surface plates of the air-press. If ultraviolet-curing-type sealing material is used for the seal pattern 6, it is cured by irradiating ultraviolet rays through transparent thick surface plates made of glass or an acrylic material. Thus a so-called empty cell is formed.

At step 816, the unused periphery portion of the substrates outside the display area is cut off. At step 818, in the liquid crystal filling process, the cell and a pool of liquid crystal are set in a vacuum chamber, then the air-pressure of the chamber is decreased to approximately 25–90 Pa. The injection openings of the cell are then dipped into the liquid crystal, and the chamber is leaked to atmospheric air pressure, by which the cell is filled up with the liquid crystal 3 by the pressure difference and by a capillary phenomenon. At step 820, the cell filled up with the liquid crystal 3 is taken out from the chamber, and the openings of the cell are sealed with resin or the like, then the extraneous liquid crystal on the cell is washed away. At step 822, the whole cell is annealed for stabilizing the alignment of the liquid crystal 3. With the above processes, the manufacturing of the LCD device 1 is completed.

However, in the above conventional method of manufacturing LCD device 1, it has been difficult to obtain the sufficient precision of the alignment of the substrates and sufficient uniformity of the gap. The reason is that, in the conventional method, the process of substrate alignment and the process of gap forming by pressing are separate. Therefore, the cured ultraviolet resin for temporary bonding after the substrate alignment is sometimes broken by force at the next pressing process, which causes slippage from the aligned positions of the two substrates.

The above problem is more troublesome in larger size substrates, especially, in the case of high resolution thin film transistor (TFT) LCD panel. If the slippage from the aligned position occurs, additional margin becomes necessary for alignment precision between the pixel electrodes formed on one of the substrates and the black matrix formed on another substrate, which causes a serious problem of a low opening ratio.

Also, when ultraviolet-curing-type sealing material is used for the seal pattern, ultraviolet rays are irradiated through the transparent surface plate, which causes the gradual temperature rise of the surface plate by the radiant heat, then, the temperature of the substrate touching the heated surface plate becomes higher than another substrate. If the seal pattern is then cured in the state where the temperature of the respective substrates is different, the non-uniformity of the gap of the LCD device occurs because the attached substrates bend when they are cooled down to the room temperature. The non-uniformity of the gap directly causes non-uniformity of display, which is a serious problem in an LCD device, especially in a large size LCD device.

As described above, in the conventional manufacturing method, it has been difficult to realize the sufficient precision of the substrate alignment and the gap.

In the above, a vacuum injection method, which has been popular for mass-production, is described for filling a cell with liquid crystal. Other than that, there is a dropping method, i.e., a substrate on which a predetermined volume of liquid crystal is dropped in advance and attached with another substrate in a vacuum ambience. Although the order of the liquid crystal filling process is different between the two methods, the problems described above exist in both methods.

The present invention aims to address conventional problems and to provide a method of manufacturing an LCD device for coping with a larger size substrate for a larger size LCD device used for an LCD monitor or the like by which a CRT can be replaced. Further, the present invention aims to provide a manufacturing method for realizing a more precise and uniform gap for a high quality display, and for realizing more precise substrate alignment, thus, providing a brighter display with a larger opening ratio.

SUMMARY OF THE INVENTION

The method of manufacturing an LCD device in the present invention comprises a process of forming a seal pattern by applying sealing material for enclosing liquid crystal on one of a pair of substrates between which the liquid crystal is sandwiched, a process of forming spacers on one of the pair of substrates by spraying spacers or by forming protrusions for determining a cell gap, and a process of forming a predetermined cell gap in the ambient air pressure, by pressing toward each other the pair of aligned substrates which are respectively held in the manner of facing each other by a pair of surface plates, in which at least one of the surface plates is movable.

Also, in the present invention, a two layer buffer plate comprising a hard layer and an elastic layer is placed between at least one of the surface plates and at least one of the substrates in the above cell gap forming process.

Also, in the present invention, one of the substrates is held by a vacuum-chuck by providing one of the surface plates with holes or grooves, through which air is drawn, in the above cell gap forming process.

The method of manufacturing an LCD device of the present invention further comprises a process of forming a dummy seal pattern having a continuous seal line enclosing the seal pattern formed in the above seal pattern forming process.

In the present invention, the substrate alignment and the gap forming are performed in one continuous process in a vacuum chamber, which is different from the conventional method in which these are performed in separate processes. Accordingly the precision of alignment and uniformity of the cell gap can be improved, and, when the dummy seal pattern is formed, the improved uniform cell gap can be more constantly obtained.

DESCRIPTION OF THE PREFERRED EMBODIMENTS

First Exemplary Embodiment

A first exemplary embodiment of the present invention is described referring to FIG. 1 through FIG. 4.

Figure 1:
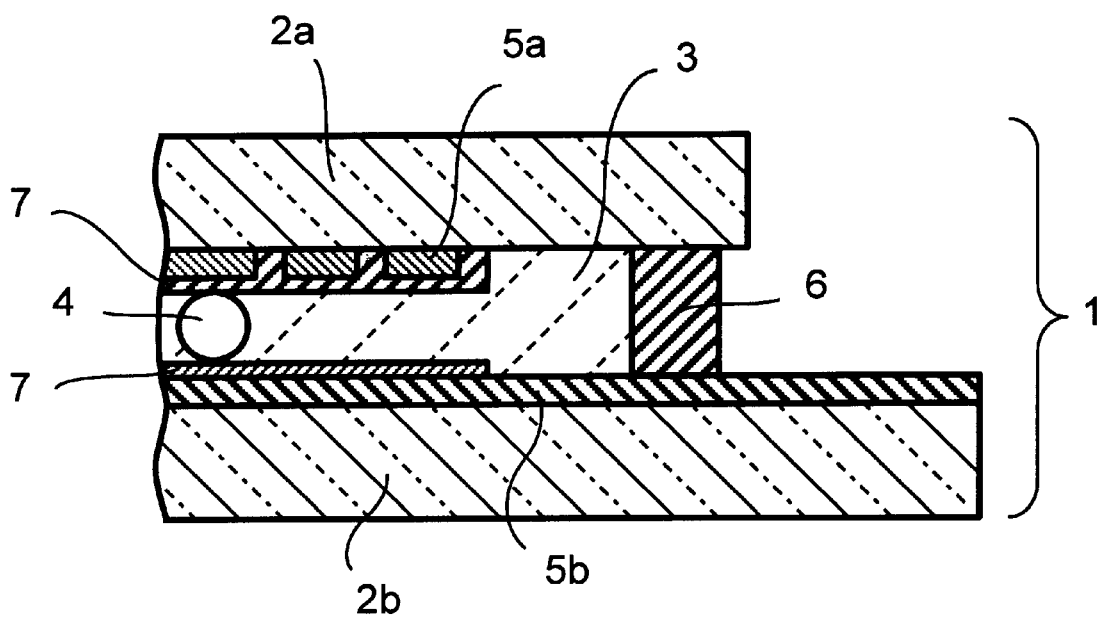
FIG. 1 is a fragmentary cross sectional view showing the structure of an LCD device for explanation of exemplary embodiments of the present invention.

FIG. 1 illustrates a cross sectional view of an LCD device according to an exemplary embodiment of the present invention. This LCD device 1 comprises spacers 4 scattered between a pair of substrates 2a and 2b having, respectively, for forming a predetermined cell gap display electrodes 5a and 5b. The cell gap, formed between the substrates 2a and 2b, is filled up with a liquid crystal 3. On the outer surfaces of the pair of substrates 2a and 2b, polarizers and the other optical films (not illustrated) are disposed at respective optimal positions. For the substrates 2a and 2b, a color filter substrate, an array substrate having active element arrays, or a substrate having a plurality of striped transparent electrodes may be used.

Spacers 4 have a shape of a ball or a stick, for example, made of resin such as benzoguanamine or the like, or silicon dioxide ($SiO_2$). In some cases, the spacers 4 are fixed on the substrates 2a and 2b for improving the uniformity of a cell gap. At the periphery of the LCD device 1, a seal pattern 6 is formed. For the seal pattern 6, epoxy resin of heat curing type, or, ultraviolet curing type such as radical polymerization type or a cationoid polymerization type may be used.

Figure 2:
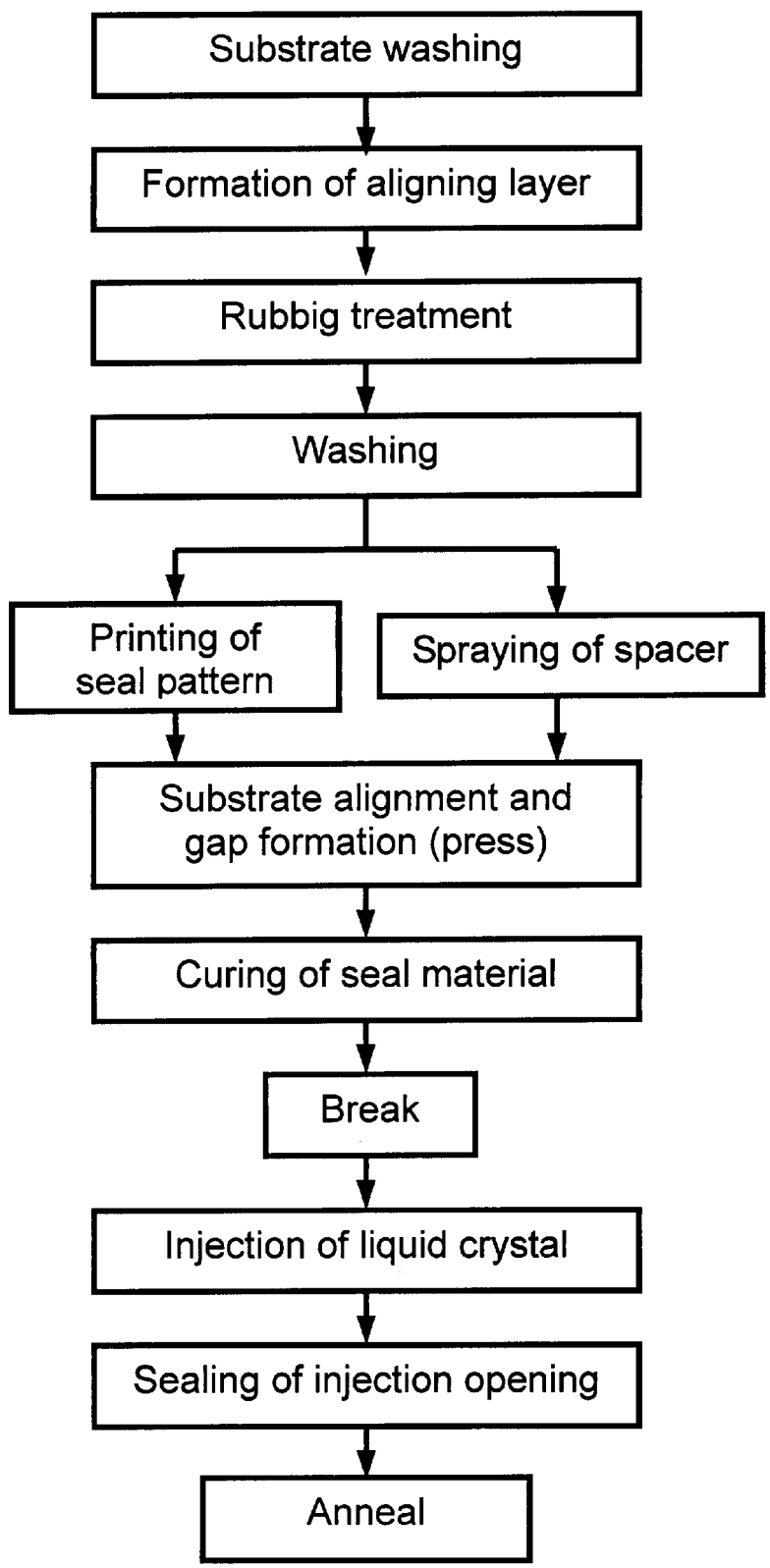
FIG. 2 is a flow chart showing the method of manufacturing an LCD device in a first exemplary embodiment of the present invention.
Figure 4:
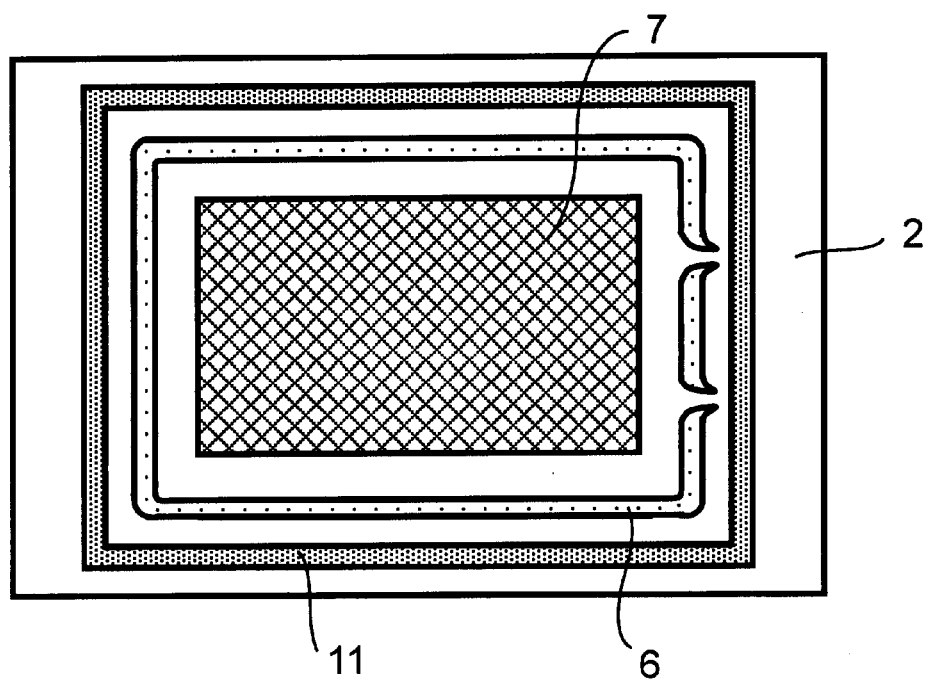
FIG. 4 shows the seal patterns of the first exemplary embodiment of the present invention.

Hereinafter, the method of manufacturing the LCD device 1 in the first exemplary embodiment of the present invention in which the filling of liquid crystal 3 is performed by the injection method is described referring to the flow chart of FIG. 2. After cleaning the substrates 2a and 2b, at step 202 liquid alignment material is applied on the substrates by off-set printing, then the alignment material is dried in a high temperature ambient. At step 204, alignment films 7, as shown in FIG. 4 are formed, on both substrates 2a and 2b. At step 206, rubbing is performed on the surfaces of the alignment films 7 by using a rubbing cloth, for example. At step 208, the surfaces of the alignment films are cleaned if there is foreign matter on them. At step 210, a seal pattern 6 having injection openings as shown in FIG. 4 is formed on one of the substrates, e.g., on 2a. At step 212, spacers 4, are formed on either substrate 2a or 2b by spraying or other conventional methods.

Figure 3:
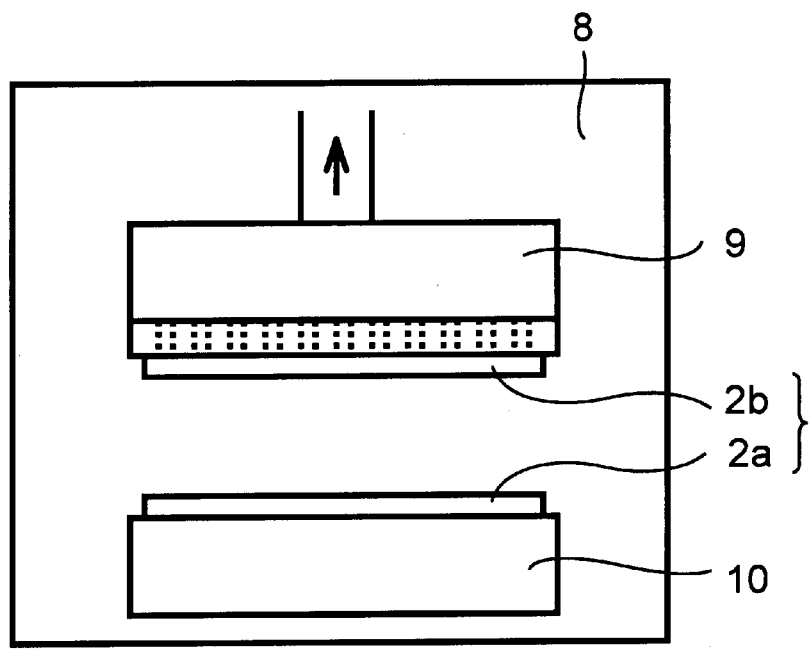
FIG. 3 shows an outline of an equipment for attaching substrates in the first and a second exemplary embodiment of the present invention.

At step 214, the position alignment of the substrates 2a and 2b are performed using equipment shown in FIG. 3. The equipment may be a press machine having an upper side surface plate 9 and a lower side surface plate 10 in a vacuum chamber 8, wherein at least one of the surface plates is movable. The equipment may also be provided with an image recognition camera (not illustrated). The operation of the equipment as illustrated in FIG. 3 is described hereinafter. First, one of the substrates, such as 2a is held by the lower side surface plate 10. Next, the other substrate 2b is held by the vacuum-chuck formed on the upper side surface plate 9, by drawing air through the holes or grooves formed through the upper side surface plate 9. Then, after decreasing the air pressure inside the vacuum chamber 8 to a predetermined vacuum level, the alignment of the upper side substrate 2b and the lower side substrate 2a is performed to a predetermined accuracy referring to the alignment marks (not shown). Then pressure is applied to the surface plates 9 and 10 until the gap between the substrates becomes a predetermined thickness. Then the chamber 8 is leaked to atmospheric air pressure. In the above vacuum-chuck of the substrate 2b by the upper side surface plate 9, it is necessary not to drop the substrate 2b during the process by creating a sufficient vacuum level for the vacuum-chuck. For example, for holding a glass substrate having a 0.7 mm thickness with the vacuum-chuck, it is sufficient if a vacuum level of approximately 40 Pa is created for the vacuum-chuck when the vacuum level of the vacuum chamber 8 is about 90 Pa for instance.

At step 216, the seal pattern sandwiched between the substrates 2a and 2b is cured by applying heat or by irradiating ultraviolet rays. Thus, an empty cell is formed.

At step 218, the non-used periphery portion of the empty cell is cut off. At step 220, the cell and a pool of liquid crystal are set in a vacuum chamber, then the injection openings of the cell are dipped into the liquid crystal after the vacuum level in a vacuum chamber becomes stable at about a predetermined vacuum level. Then the chamber is leaked to the atmospheric air pressure, by which the cell is filled with the liquid crystal using the air pressure difference between the inside and the outside of the cell, and by capillary action. After the cell is filled with the liquid crystal, the injection openings of the cell are sealed with resin. Then the extraneous liquid crystal on the cell is washed away. At step 222, the whole cell is annealed to stabilize the alignment of the liquid crystal orientation. Thus the LCD device is completed.

In general, the seal pattern 6 shown in FIG. 4 for enclosing liquid crystal is formed by writing with a dispenser or by printing using a screen plate. In the present invention, a dummy seal pattern 11 having a continuous seal line enclosing the seal pattern 6 is formed for forming a more uniform gap during the process of attaching the substrates in the vacuum chamber. It has been discovered by experiment that the most uniform gap is obtained when the distance between the seal pattern 6 and the dummy seal pattern 11 is between about 10–15 mm. The dummy seal pattern 11 functions to keep the space inside the seal pattern in f a vacuum state while the vacuum chamber is leaked to atmospheric air pressure and the seal patterns are cured, until the periphery portion of the empty cell is cut off. Therefore the substrates are kept pressed by the pressure difference such that the thickness of the gap is determined by the size of the spacers. Accordingly, in the present invention, when curing the seal patterns, it is unnecessary to press the substrates, different from a conventional method, by the press machine having the surface plates heated by ultraviolet rays. The occurrence of temperature differences between the two substrates can be prevented and bending of the substrates can also be prevented.

Second Exemplary Embodiment

Figure 5:
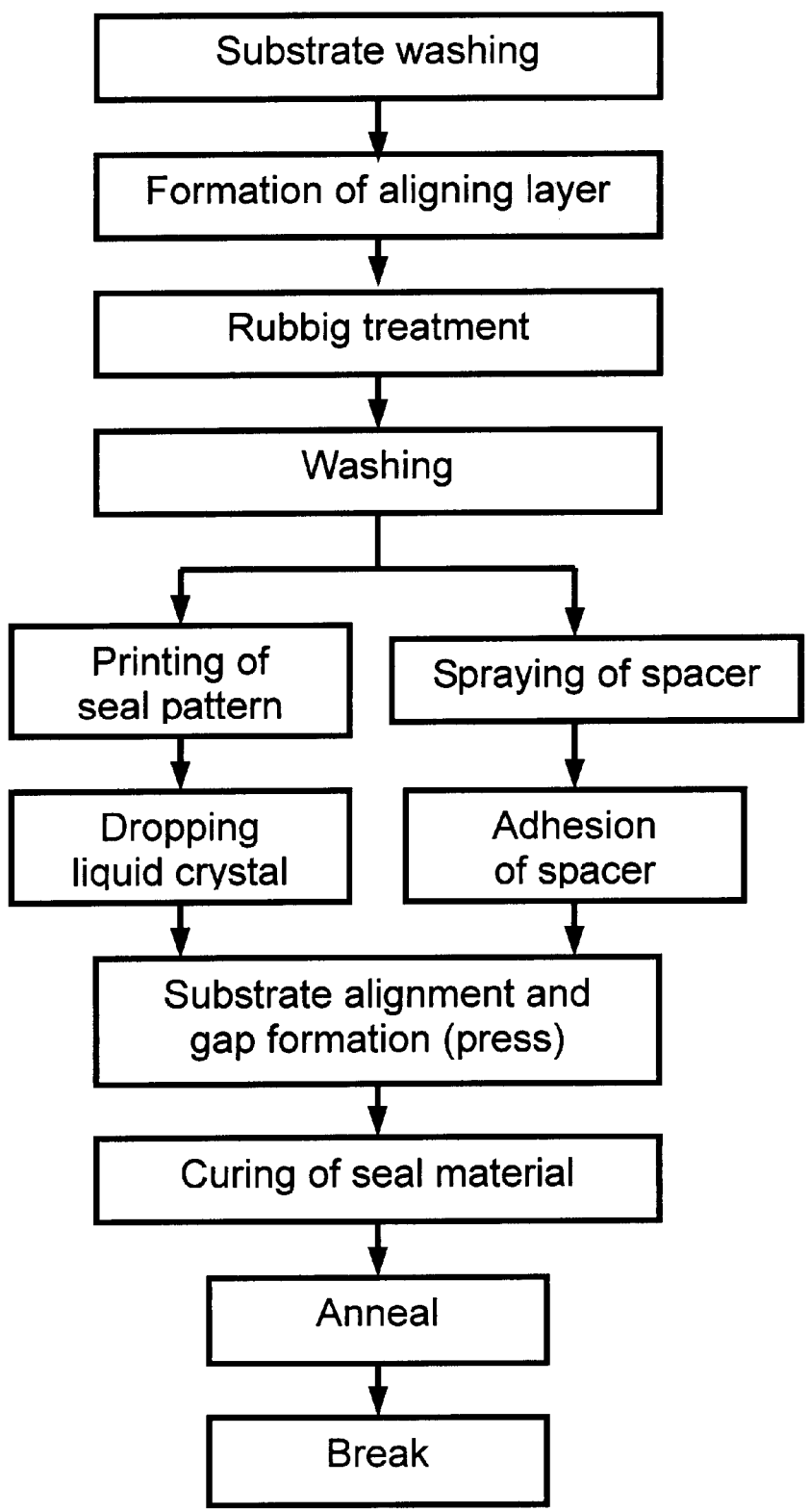
FIG. 5 is a flow chart showing the method of manufacturing an LCD device in the second exemplary embodiment of the present invention.

Hereinafter, explanation of a second exemplary embodiment of the present invention is described referring to FIGS. 1, 3, 5 and 6. FIG. 5 is a flow chart showing processes of the method of manufacturing an LCD device in the second exemplary embodiment of the present invention which adopts a dropping method for filling liquid crystal. After cleaning the substrates 2a and 2b at step 500, liquid alignment material is applied to the substrates by off-set printing, for example, at step 502 the alignment material is dried in a high temperature ambient, forming alignment films 7 on both substrates, as shown in FIG. 1. At step 504, rubbing is performed on the surfaces of the alignment films 7 by using rubbing cloth for example. At step 506 the surfaces of the alignment films are cleaned if there is foreign matter on them.

Figure 6:
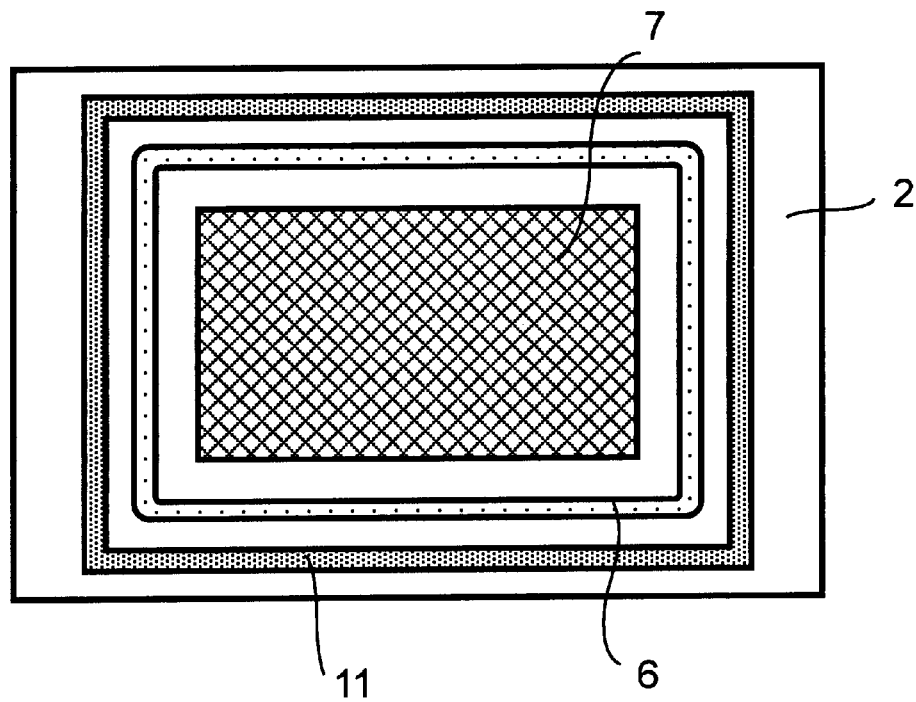
FIG. 6 shows the seal patterns of the second exemplary embodiment of the present invention.

At step 508, a seal pattern 6 having a continuous line of sealing material, as shown in FIG. 6, is formed on the substrate 2a by writing or by printing. At step 510 spacers 4 are evenly sprayed on substrate 2b. For seal pattern 6, UV resin such as radical polymerization type or a cationoid polymerization type may be used. For the spacers 4, a fixing type may be used, and at step 514 the spacers are fixed on the substrate 2b because it is necessary that the spacers have certain fixing strength in the dropping method. By fixing the spacers, the spacers will not move during the following process of pressing the substrates, thus preserving uniformity of the gap.

At step 512, degassed liquid crystal is dropped on the substrate 2a on which seal pattern 6 has been formed. The volume "L" of the dropped liquid crystal is computed by the equation of $L = S \cdot d \cdot \gamma$. Where, "S" represents the display area of the LCD device, "d" represents the predetermined dimension of a cell gap, and "$\gamma$" represents a correction factor, which is expressed as $1.03 \leq \gamma \leq 1.04$ based on experimental results. The dropping of the liquid crystal is performed according to a predetermined dropping pattern so that the dropped liquid crystal is spread evenly.

At step 516, the position alignment of the substrates 2a and 2b are performed using the equipment of FIG. 3 as explained in the first exemplary embodiment. After setting the air pressure inside the vacuum chamber 8 to a predetermined degree, the alignment of the substrates is performed to a predetermined accuracy referring to the alignment marks. Then the substrates are pressed toward each other by applying pressure to the upper side and the lower side surface plates, by which a cell gap of a predetermined thickness is formed. The vacuum chamber 8 is then leaked to atmospheric air pressure.

At step 518, the seal pattern 6 is cured by irradiation with ultraviolet rays. In this occasion, the display area is masked or a laser beam may be used for preventing quality change of the liquid crystal by the unwanted irradiation of the ultraviolet rays. At step 520, annealing is performed for stabilizing the alignment of the liquid crystal 3. At step 522 the non-used periphery portion of the substrates is cut off. Thus, the LCD device 1 is completed.

The liquid crystal dropping method of this exemplary embodiment is more suitable for establishing an effective and flexible production line in regard to lead-time when compared with the vacuum injection method of the first exemplary embodiment. In addition, the consumption of the liquid crystal can be minimized.

Furthermore, in the dropping method, if the dummy seal pattern 11 shown in FIG. 6, having continuous seal line enclosing the seal pattern 6 is formed, the uniformity of the cell gap of the center part and the periphery part of the LCD device 1 can be improved.

Third Exemplary Embodiment

Figure 7:
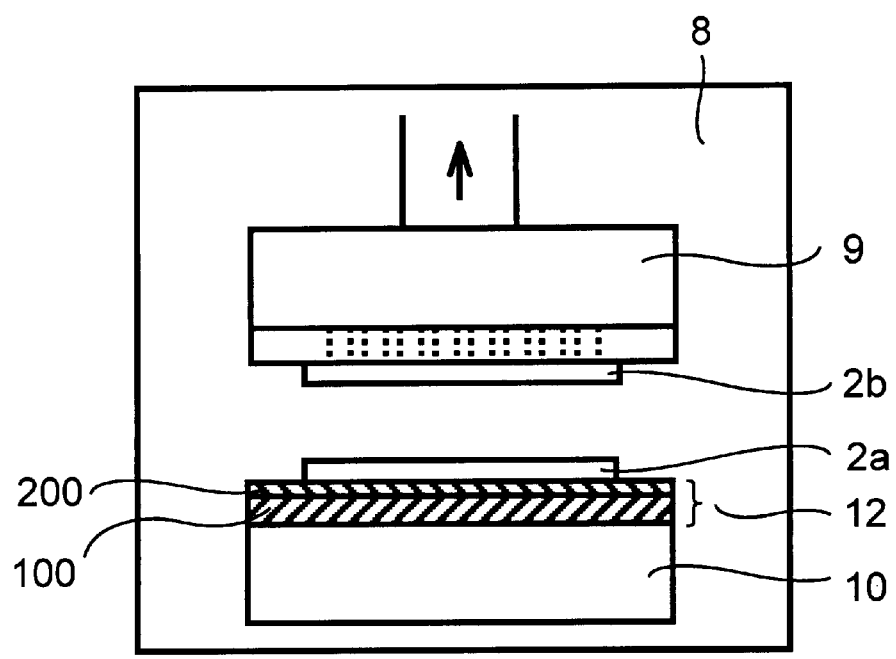
FIG. 7 shows the outline of an equipment for attaching substrates in a third exemplary embodiment of the present invention.
Figure 8:
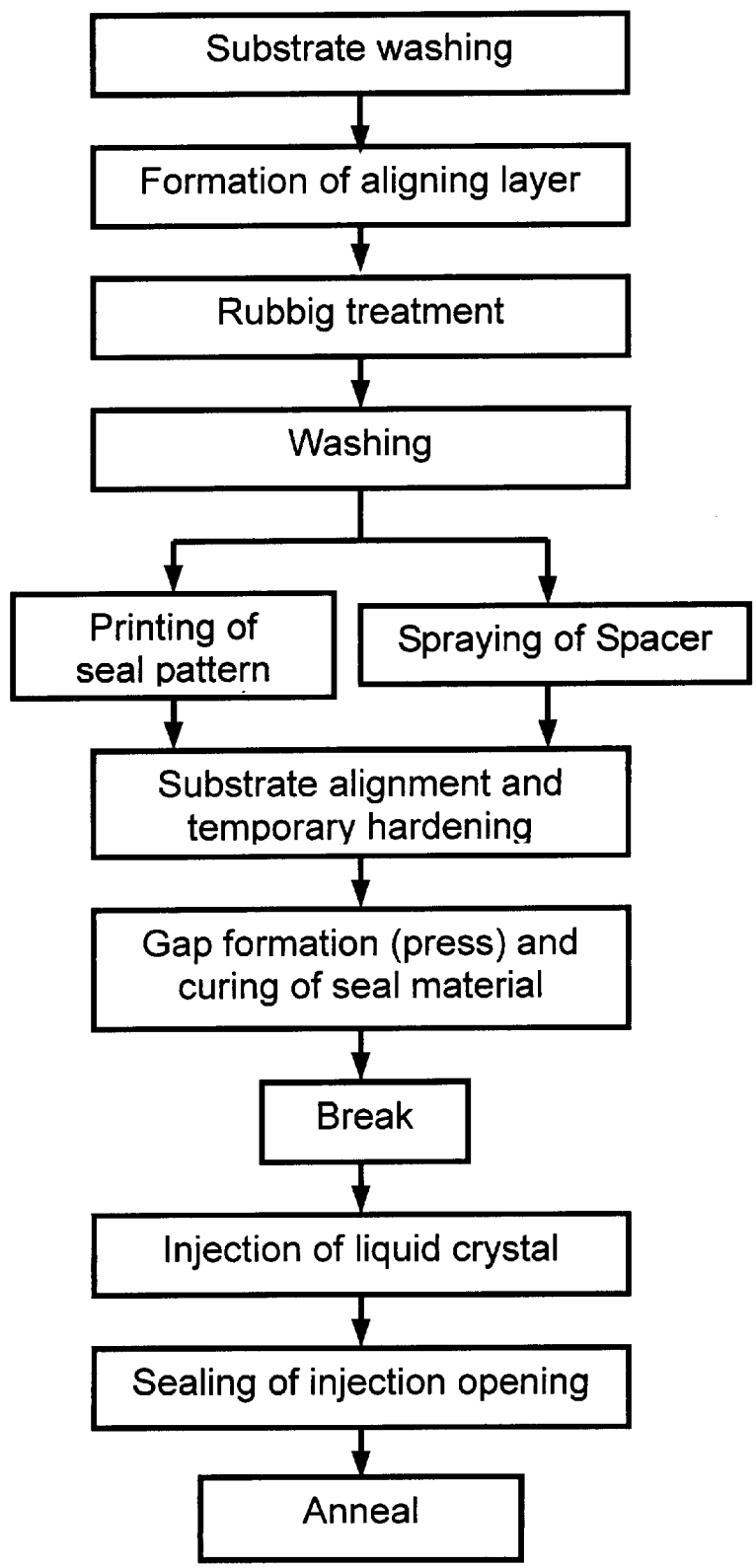
FIG. 8 is a flow chart showing an example of the conventional method of manufacturing an LCD device.

In this exemplary embodiment, a two layer buffer plate 12 shown in FIG. 7, is placed between substrate 2a and the lower side surface plate 10, and the substrate 2b is held by the upper side surface plate 9 of equipment for attaching the substrates. The two layer buffer plate 12 comprises an elastic layer 100 which absorbs dispersion of the thickness and bending of the two substrates, and a hard layer 200 which vertically repulses pressure to any point of the substrates. Accordingly, when pressing the substrates, the buffer plate 12 works for more constantly forming a uniform cell gap. This exemplary embodiment is applicable for both the vacuum injection method and the dropping method in filling liquid crystal, whose details are described in the first and the second exemplary embodiments.

In the above exemplary embodiments, a spraying method is described for forming a spacer for the predetermined cell gap. Other than that, there is a method of forming a protruded pattern of photoresist by photolithography technology, or forming a protruded pattern of resin by printing.

As described above, the present invention can provide a method of manufacturing an LCD device with which the productivity of the LCD device can be improved by preventing the slippage from the aligned position and the bending of the substrates in the process of forming a cell gap, which is realized by performing the alignment and the gap forming of the substrates in one continuous process which has been separated in a conventional method. As a result, uniformity and precision of the cell gap, and precision of alignment can be improved, by which a high quality LCD device can be produced.

Also, in the present invention, since the gap forming is performed in a vacuum chamber and the dropped volume of liquid crystal is computed in advance, more precise gap can be obtained, by which the LCD device of larger size and narrower cell gap, which are forthcoming requirements, can be realized.

Although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A method of manufacturing an LCD device comprising the steps of:
   (a) forming a first seal pattern defining a first cell area for enclosing a liquid crystal by applying a sealing material to a portion of at least one of an upper substrate and a lower substrate between which said liquid crystal is sandwiched, wherein said upper substrate and said lower substrate are coupled to an upper surface plate and a lower surface plate, respectively, wherein at least one of said surface plates are moveable;
   (b) forming a second seal pattern completely enclosing said first pattern by applying a sealing material to one of the upper substrate and the lower substrate forming a second cell area;
   (c) forming a spacer on at least one of said substrates for determining a cell gap;
   (d) aligning and pressing together said upper substrate and said lower substrate in a vacuum chamber thereby evacuating said first and second cell areas to form evacuated first and second cell areas within said second seal pattern;
   (e) increasing pressure in said vacuum chamber to a point wherein a pressure differential between said first and second evacuated cell areas within said second seal and said increased pressure is at least sufficient to hold said upper and lower substrates together;
   (f) curing at least said first seal pattern;
   (g) removing said second seal pattern; and
   (h) introducing a liquid crystal in said first cell area defined by said first seal pattern.

2. The method of manufacturing an LCD device according to claim 1, further comprising the step of:
   placing a buffer plate between at least one of (i) said upper surface plate and said upper substrate and (ii) said lower surface plate and said lower substrate.

3. The method of manufacturing an LCD device according to claim 2, wherein said step (d) further comprises the step of:
   (d1) holding one of said pair of substrates by a vacuum-chuck using at least one of said pair of surface plates, wherein said at least on of said surface plates is provided with one of holes and grooves for drawing air for creating a higher vacuum level for the vacuum-chuck than the vacuum level of said vacuum.

4. The method of manufacturing an LCD device according to claim 1, wherein said step (d) further comprises the step of:
   (d1) holding one of said substrates by a vacuum-chuck using at least of one of said surface plates, and wherein said at least one of said surface plates is provided with one at least one of holes and grooves for drawing air for creating a higher vacuum level for the vacuum-chuck than the vacuum level of said vacuum.

5. The method of manufacturing an LCD device according to claim 1, further comprising a step of:
   dropping and applying a quantity of liquid crystal on one of said pair of substrates for filling said cell gap with said liquid crystal after said step (c).

6. The method of manufacturing an LCD device according to claim 5, further comprising the step of:
   placing a two layer buffer plate comprising a hard layer and an elastic layer between at least one of (i) said upper surface plate and said upper substrate and (ii) said lower surface plate and said lower substrate.

7. The method of manufacturing an LCD device according to claim 6, wherein said step (d) further comprises the step of:
   (d1) holding one of said substrates by a vacuum-chuck using at least one of said surface plates, and wherein said at least one of said surface plates is provided with at least one of holes and grooves for drawing air for creating a higher vacuum level for the vacuum-chuck than the vacuum level of said vacuum.

8. The method of manufacturing an LCD device according to claim 5, wherein said step (d) further comprises the step of:
   (d1) holding one of said substrates by a vacuum-chuck using at least one of said surface plates, wherein said at least one of said surface plates is provided with one at least one of holes and grooves for drawing air for creating a higher vacuum level for the vacuum-chuck than the vacuum level of said vacuum.

9. The method of manufacturing an LCD device according to claim 1, further comprising the step of:
   placing a two layer buffer plate comprising a hard layer and an elastic layer between at least one of (i) said upper surface plate and said upper substrate and (ii) said lower surface plate and said lower substrate.

* * * * *

UNITED STATES PATENT AND TRADEMARK OFFICE
CERTIFICATE OF CORRECTION

PATENT NO.    : 6,222,603 B1
DATED         : April 24, 2001
INVENTOR(S)   : Sakai et al.

Page 1 of 1

It is certified that error appears in the above-identified patent and that said Letters Patent is hereby corrected as shown below:

Column 8,
Line 12, "on" should be -- one --.

Signed and Sealed this

Sixteenth Day of April, 2002

Attest:

JAMES E. ROGAN
*Attesting Officer*    *Director of the United States Patent and Trademark Office*